Jan. 1, 1929.  M. HANDSCHIEGL  1,697,315
SIMPLIFIED DOUBLE EXPOSURE METHOD
Filed April 26, 1926
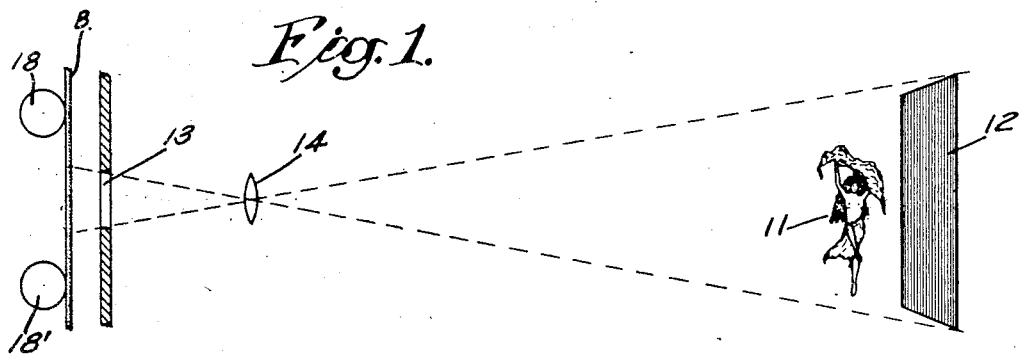
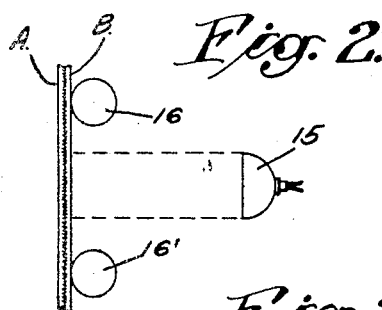
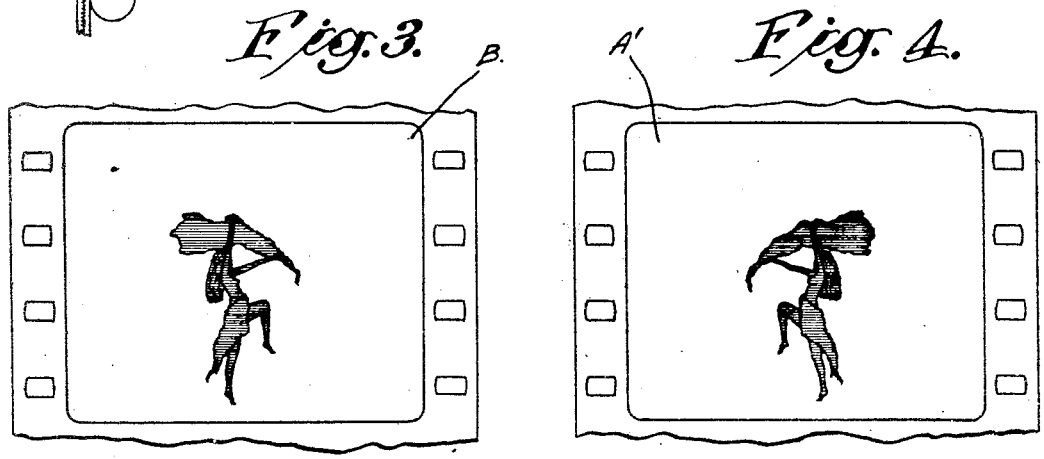
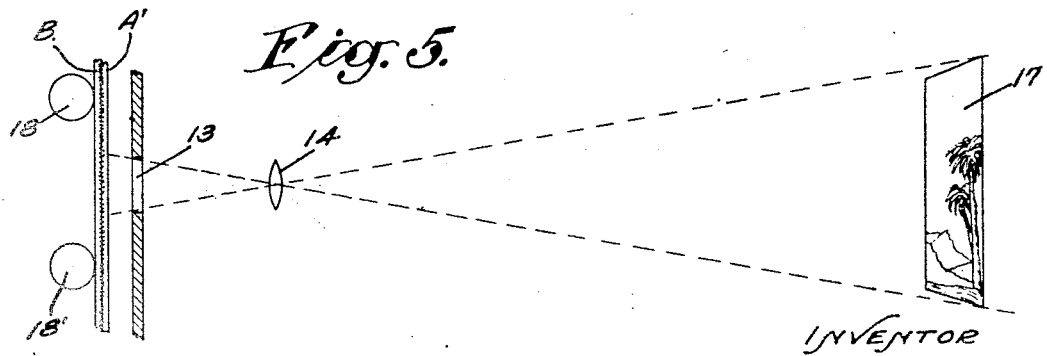
INVENTOR
MAX HANDSCHIEGL
ATTORNEY Patented Jan. 1, 1929.

1,697,315

UNITED STATES PATENT OFFICE.

MAX HANDSCHIEGL, OF HOLLYWOOD, CALIFORNIA, ASSIGNOR TO BESSIE HANDSCHIEGL, OF LOS ANGELES, CALIFORNIA.

SIMPLIFIED DOUBLE-EXPOSURE METHOD.

Application filed April 26, 1926. Serial No. 104,791.

It is an object of this invention to provide a method, simpler than and otherwise superior to the methods set forth in my application Serial No. 610,334, filed January 2nd, 1923, and Serial No. 59,587, filed September 30th, 1925, for the producing of double exposure effects upon motion picture films.

As was observed in the application first above mentioned, it is often desirable, in the production of motion pictures to combine several actions upon one film. In other words, it is often desirable to photograph a figure or subject which constitutes one "action," and then to photograph, upon the same film, a scene or "action" at another place,—making it appear, in the final production, that both "actions" occurred simultaneously, or that an action or part shown was taken with certain scenery or background.

As in the former cases referred to, it is an object of this invention to provide a method whereby, a figure or an "action" having been photographed in one location, and, the partly exposed film (this film being used in the present case, in the intervening production of a mat) having then been taken to another location, a second scene, or other "action" may be photographed, through said mat, upon the same negative,—thus making the two light impressions which the film received cooperative and non-interfering in their effects; and it is a further object of this invention to provide a process, of the general character referred to, which is of greater simplicity and economy than any process heretofore proposed, this being a process or method by which the separate "actions" may be made to register with any required degree of precision and by which hazy effects and poorly defined outlines may be substantially or entirely avoided.

It is a unique feature of my present invention, as compared with those described and claimed in the mentioned prior applications, that, instead of simultaneously exposing a plurality of negative films to a scene or action (presumed to be taken before a non-actinic or similar background) and then using one of these films in the direct or indirect production of a mat, I initially expose, in the present case, but a single negative film; and I produce my mat, for use during a subsequent exposure of the same film, by taking from said film, after developing but before fixing the same, a suitable print,—this print being taken in such manner as to avoid detrimental effects upon the original film and preferably in such manner as to produce (as by reason of a face-to-face relationship thereto during printing) a print whose images exhibit right-to-left symmetry relatively to the images upon the original negative.

It is an object of this invention to produce, by a technique which involves the use of light sources providing rays which differ in length, and by the use of films carrying emulsions which are similarly different in sensitiveness, effects which are not otherwise obtainable. That is to say, it being now possible commercially to obtain film strips provided with emulsions which are sensitive to special (short or long) waves or rays (as, red rays) which are entirely or substantially without effect upon the emulsions with which motion picture films are more commonly provided, it becomes possible, by using an intervening development but deferring fixation, and by working alternately (during exposure to successive scenes or actions or backgrounds) with ordinary light and (during the printing of mats) with (say) red light, to add one image after another to the negative film,—developing each image and preparing a mat therefrom by the use of print films having special emulsions and by the use of corresponding special rays,—without effect upon the original negative. The final exposure of the film being effected by an exposure through the last mat previously prepared and the final development of the negative film being followed by a suitable fixation, the resultant complete negative film may be used in a usual manner; and the facts and principles above set forth may be used to produce either double-exposed negative films or triple-exposed or other plural-exposed films.

Other objects of my invention may be best appreciated from the following description of an illustrative embodiment thereof, taken in connection with the appended claims and the accompanying drawings, in which, Fig. 1 is a diagrammatic view suggesting a manner in which a figure or action may be initially photographed upon an ordinary negative film.

Fig. 2 is a diagrammatic representation of a subsequent step in which a print film, sensitive to a wave length or ray to which a negative film is insensitive, may be impressed with an image therefrom.

Figs. 3 and 4 are respectively elevational views showing the left-to-right symmetry exhibited by images respectively upon a developed but unfixed negative film and upon a mat film produced therefrom, assuming said films to be arranged with their emulsion surfaces similarly disposed.

Fig. 5 is a view comparable to Fig. 1, but suggesting a manner in which a second or subsequent scene may be photographed upon the same negative,—the print resulting from operations including the step shown in Fig. 2 being interposed as a mat.

Referring to the details of that specific embodiment of my invention chosen for purposes of illustration, 11 may be a figure intended to represent a wood nymph or another action, taken before a black or red or other non-actinic background 12; and B may be a sensitized film, of any ordinary or preferred type suitable for the production of a negative, such as Eastman's ordinary stock film—13 being an aperture through which rays focused by a lens or lens system 14 are suitably presented thereto.

After the film B has been "shot" in the indicated manner, or in any preferred manner producing the desired images (using a background which can have no undesired light effects) said film may be developed, in a usual manner, and sufficiently to bring out the images impressed thereon,—this development being however unaccompanied by any present fixation. The developed but unfixed film B may then be used—as by disposing the same face-to-face (emulsion to emulsion)—in front of a suitable print film A,—this print film being provided with an emulsion which is sensitive to a special range of wave lengths or rays (such as red rays) to which the negative film B is practically or entirely insensitive. (Eastman's plain panchromatic stock may be advantageously used as the print film A.) If desired, means such as a parabolic mirror 15, reflecting red parallel rays from a point source may be used in this printing operation and, assuming that no enlargement or diminution is intended, the films A and B may be kept in immediate contact during this printing operation; and they may be advanced in synchronism and perfect register by any suitable means, as by sprockets conventionally suggested at 16, 16'.

The print film A may then be suitably developed and fixed, and either chemically "reversed" (before or after fixation) or used in the making of another print, to form a mat A' very exactly corresponding, in its images (see Figs. 3 and 4) with the negative film B, although exhibiting left-to-right symmetry relatively thereto—and being therefore entirely suitable for use as a mat during a second exposure of the negative film B, as to an "action" or scene or background 17. During this second exposure, which may be made through the aperture 13 and with the same lens or lens system 14 by which the initial or previous exposure was made, the mat film A' may be again kept in immediate contact with the negative film B; and both films may be advanced in exact synchronism by, for example, sprockets 18, 18', —identical with or exactly similar to the mentioned sprockets 16, 16'.

The described operations may be alternated two or more times; and after the final exposure of the film B, or its equivalent, this film may be not only developed but fixed, in readiness for use in the production of positives in a known manner, or in readiness for any desired subsequent operations.

The simplicity and directness of the method herein described is likely to be immediately appreciated; and it will be appreciated also that it permits the successive exposures to be made under various conditions of illumination and in a manner favorable to exact focusing upon objects at different distances from the camera or cameras by which the successive exposures are made. Although I have herein described a single complete embodiment of my present invention, it should be understood that various features thereof might be independently employed, and also that numerous modifications, additional to those suggested herein, might be devised, by those skilled in the art to which this case relates, without involving the slightest departure from the spirit and scope of my invention, as the same is indicated above and in the following claims.

I claim as my invention:

1. A method of preparing plural exposed original negatives which comprises: making an initial exposure of an action before a background which produces no undesired light effects upon a negative film whose emulsion is practically insensitive to a selected range of wave lengths coming from said background; developing the same to bring out resultant image of said "action", the fixation of said image being deferred; taking a print therefrom by light within said selected range of wave lengths and upon a print film whose emulsion is sensitive thereto; developing said print film to produce a mat; making a subsequent exposure of said negative through said mat; again developing said negative; and fixing the same after the last development thereof.

2. A process of the general character described in claim 1, in which said print film and said negative film are disposed with their emulsion surfaces face-to-face during printing and during subsequent exposure.

3. A process of the general character described which comprises: forming, by rays within a special range of wave lengths, and upon a film whose emulsion is sensitive to said range of wave lengths, an image corresponding with a developed but unfixed image occupying part of a negative whose emulsion is practically insensitive to said range of wave lengths, said negative thus remaining susceptible to a subsequent light impression in which said first-mentioned film may serve to exclude light from parts of said negative.

4. A process of the general character described which comprises: forming, by rays within a special range of wave lengths, and upon a film whose emulsion is sensitive to said range of wave lengths, an image corresponding with a developed but unfixed image upon a negative whose emulsion is practically insensitive to said range of wave lengths; and thereafter developing and fixing said first-mentioned film to form a mat.

5. A process of the general character described which comprises: forming, by rays within a special range of wave lengths, and upon a film whose emulsion is sensitive to said range of wave lengths, an image corresponding with a developed but unfixed image upon a negative whose emulsion is practically insensitive to said range of wave lengths; thereafter developing said first-mentioned film and forming a mat therefrom; and disposing said mat before said negative during a subsequent exposure thereof.

6. A method of preparing plural exposed original negatives upon film which is practically insensitive to light of a selected range of wave lengths, which comprises: making an initial exposure of an action before a background of a color which will not light impress said film; developing said film to bring out the resultant image of said action, the fixation of said image being deferred; taking a print from said image by light within said selected range of wave lengths upon a film whose emulsion is sensitive thereto; developing said print film to produce a mat; making a subsequent exposure of said negative through said mat; again developing said negative; and fixing the same after the last development thereof.

In testimony whereof, I have hereunto set my hand at Los Angeles, California, this 12th day of April, 1926.

MAX HANDSCHIEGL.